Patented Oct. 13, 1925.

1,557,519

UNITED STATES PATENT OFFICE.

CARLETON ELLIS, OF MONTCLAIR, NEW JERSEY.

SYNTHETIC RESIN COATING COMPOSITION.

No Drawing. Application filed February 7, 1921, Serial No. 443,250. Renewed January 9, 1924.

*To all whom it may concern:*

Be it known that I, CARLETON ELLIS, a citizen of the United States, and a resident of Montclair, in the county of Essex and State of New Jersey, have invented certain new and useful Improvements in Synthetic Resin Coating Compositions, of which the following is a specification.

This invention relates to a coating composition or varnish and relates especially to a composition containing a phenolic sulphur chlorid resin. The coating composition may be prepared either in the form of a concentrate or basis requiring in most cases thinning for use, or may be prepared in a diluted state in condition for direct application to wood, metal or other surfaces.

The essential ingredient of the present composition is a resin or type of resins prepared by reacting on phenolic bodies with sulphur chloride or a reagent containing sulphur chloride or equivalent compound so as to produce a resinous material containing a substantial percentage of combined sulphur. If ordinary carbolic acid or phenol is treated with sulphur monochloride, the latter being present in an amount equal to the weight of the phenol or preferably two or three times the weight of the phenol, a resinous mass is formed with simultaneous evolution of hydrochloric acid. The resin contains a percentage of sulphur varying from 20% and upwards to 60% or thereabouts. Since the sulfur of the sulfur chlorid wholly or largely remains as a constituent of the resin, while the chlorin of the sulfur chlorid is largely converted into HCl which is driven off, the term "sulfur resin" is used to distinguish these resins. In the case of the lower resins of lower sulphur content, that is those made with about an equal weight of sulphur chloride (or 100% of the latter), practically all the sulphur enters into combination while when 300 to 350% of sulphur chloride is used (based on the amount of the phenol), oftentimes a small amount of sulphur is liberated and may be separated by means of a suitable solvent such as alcohol-benzol mixture. Most of the resins thus made from phenol are not readily soluble in drying oils such as are used in making varnish, e. g. linseed and Chinese wood oil. The cresol resins on the other hand dissolve in linseed oil quite readily and form an excellent basis for a varnish composition. The cresols are converted into harder resins with a lesser amount of sulphur chloride than is the case with phenol. With a high grade phenol approximately 250% of sulphur chloride is usually necessary to secure a desirably hard resin. With 300% or 350% of sulphur chloride resins are obtained from phenol which are quite resistant to acids such for example as concentrated sulphuric acid. In the case of cresol a desirably hard resin may be made with 135% of sulphur chloride. This resin when heated with linseed oil dissolves readily causing the oil to acquire increased viscosity or if a major amount of the resin is present to yield a gummy mass which may be thinned with a suitable solvent.

Various percentages of sulphur chloride may be used in forming such an oil-soluble phenolic resin from cresol. While 135% or sulphur chloride is a desirable proportion other proportions such as 125% or 150% or more or less may be used. The higher the proportion of combined sulphur the more resistant the resin appears to be to the action of strong acids such as concentrated sulphuric acid or concentrated hydrochloric acid. Generally speaking the resin is discolored or attacked by concentrated nitric acid. The resin is resistant to many alkalis such as carbonate of soda or potash, bicarbonate of soda, concentrated ammonia water and alkaline soaps. The resin is however dissolved by caustic soda or caustic potash solutions.

The varnish manufacturer has been seeking a resin which is not readily affected by the acids and alkalis and which is soluble in oils so that oil varnishes having resistant qualities could be made, suitable for use in places exposed to acid fumes, ammonia vapors and alkalis, as a coating for concrete to withstand the action of the cement alkali and as a varnish or paint for floors and wall boards which are subjected to the action of strong soap solutions which quickly attack varnish and paint of the usual type.

The resin above described has desirable properties for the purposes aforesaid and may be employed as a varnish basis for these purposes as well also as a grinding varnish where it is important to have a resinous material present which does not "liver," that is, does not react with basic pigments such as zinc oxide to form granular masses or caky materials.

While I have referred to ordinary phenol as not producing a very satisfactory oil-soluble resin under the conditions aforesaid and have called attention to the soluble properties of the cresol resin it may also be stated that the higher phenols (i. e. higher than the cresols) may be used in some cases as well also as mixtures of phenol and cresol resin, the latter resin serving to carry the phenol resin into solution in case the phenol resin is not present in too large an amount.

The color of the resin is of importance as, other things being equal, varnishes are valued according to their color, light colored ones being highly prized and those which are dark have comparatively little value. If the resin is made from ordinary grades of commercial cresol a dark colored produt is obtained which imparts a brownish tone to the varnish material that is oftentimes not desirable. Phenol may be obtained cheaply in such a high grade of purity that light yellow resins are produced even on direct mixing of the sulphur chloride and the phenol and without paying much attention to the effect of the heat developed. In the case of cresol the heat developed is of importance tending to darken resins made from ordinary commercial grades of cresol and better results are obtained by having present a solvent such as benzol or solvent naphtha to distribute the heat of reaction and thus temper the violence of the reaction.

Some grades of cresol afford especially useful resins and these are mentioned in the preferred formulas of the present invention. One of these is metaparacresol for example a mixture of 60% of the meta with 40% of the paracresol. It is free from iron and nitrogenous bodies which would tend to react with sulphur chloride and discolor the resin. The result is that with such a cresol a light yellow resin is obtained even without the use of a solvent.

The varnish basis may be made in several ways one being by first forming the resin and then heating it with linseed oil, stirring well in order to prevent the resin from settling to the bottom and becoming over heated and discolored. These resins are rather sensitive to heat and discolor at temperatures lower than those of many other resins. This is probably due to some reaction taking place in the resin in which the sulphur plays a part. Consequently when strongly heating a kettle it is important to stir thoroughly.

It is also desirable to use for heating glass or enamelled kettles or kettles made of aluminum or some metal which does not form a black sulphide as the latter may be formed to such an extent that the color of the varnish will be greatly impaired. Hence with resins of high sulphur content and especially those containing some free sulphur copper kettles such as are ordinarily used in making varnishes are undesirable. The resin is stirred until it dissolves in the oil and the mixture may be thinned with turpentine or other suitable solvent.

Another method of making the varnish is to produce the resin in a solvent such as solvent naphtha and after eliminating the hydrochloric acid to add boiled linseed or other drying oil thereto.

A third procedure is to form the varnish base, that is the mixture of oil and resin in any suitable way and supply such a material as a concentrate which may be thinned as desired.

Drying oils suitable for the purpose are linseed and Chinese wood oil, also other drying or semi-drying oils such as parilla, fish oil, castor oil, cottonseed oil, soya bean oil and the like may be used to a greater or lesser extent. These oils may be used raw or boiled either alone or with the resin or in admixture with the phenolic resin and other resins such as the natural resins. Driers may be added as required.

As thinners the aromatic hydrocarbons are especially suitable as they are good solvents. However the odor of benzol, toluol and solvent naphtha is generally not liked by the painter and he oftentimes will reject a varnish because its odor is not of the orthodox type; it is desirable to use turpentine or turpentine and gasoline varnish painter's naphtha, etc., as a thinning material so far as may be accomplished. These phenolic resins are not soluble in gasoline or varnish painter's naphtha nor in turpentine to any material extent, however the linseed or drying oil serves as a solvent medium to such an extent that a considerable amount of turpentine and gasoline may be introduced. The addition of solvent naphtha assists in the solubility. In respect to solubility in these solvents the phenolic sulphur resin differs considerably from many of the other common resins.

Beside the thinners above mentioned, wood turpentine, wood tar oil, xylol, tetrahydronaphthalene, rosin spirits, pine oil, stub turpentine and other thinners may be used to a greater or lesser extent depending on the character of the resin.

In heating the oil with the resin especially when the resin contains a very high percentage of sulphur or may have associated with it free sulphur in a colloidal form the heating generally results in a slight vulcanization of the drying oil and in some cases apparently a transfer of sulphur from the resin itself to the drying oil so that a slightly vulcanized drying oil is obtained which appears to blend better with the resin and produce a more effective solvent for the resin than the unvulcanized oil.

In the case of some of the high percentage resins which may contain a little incorporated colloidal sulphur the latter may be removed by treating the solution with a small amount of freshly precipitated copper hydroxid or lead hydroxid, warming and stirring and filtering.

Various pigments may be mixed with or ground in the varnish such for example as zinc oxide or zinc white lithopone, white lead, litharge, red lead, sublimed lead or basic lead sulphate and extending material such as whiting, barytes etc. also various lakes, pigments etc. to give the requisite tone or shade. It would be expected that a resin of this character would react with basic pigments forming sulphides but this takes place in very slight degree especially with the lower percentage resins that is those made with the smaller proportion of sulphur chloride.

With the crude resins, for example cresol resin made with 135% sulphur chloride, when heated prior to purification with linseed oil a strong odor of hydrogen sulphide often is manifest. Besides this the resin has an odor which is pronounced by some to resemble iodoform. For high grade varnish this odor should be removed and for this purpose the resin is preferably deodorized by means of steam. For example after the treatment with sulphur chloride the mass which is then plastic at the temperature of the reaction is blown with steam, the temperature of the resin being maintained at about 120° C. This may continue for a half hour to an hour or more when the resin will be found quite free of objectionable odors. The deodorization may take place if desired in a vacuum deodorizing apparatus.

The resin thus deodorized may if desired be baked in an oven exposed to air, a suitable temperature being about 125° C., but higher or lower temperatures may be used, this has the advantage of hardening the resin somewhat depending upon the temperature and duration of the heat treatment. From 1 to 24 hours exposure may be given the resin in some cases. If the temperature goes above 150° C. for any protracted period there is danger of darkening the resin, this is especially true when traces of hydrochloric acid are present. At 180°–200° C. the resin undergoes decomposition with blackening, the exact temperature of discoloration or blackening varies with different resins depending upon their content of combined sulphur and possibly free sulphur and on the freedom from mineral acid. In one case a sample of phenol resin made with 175% of sulphur chloride was heated in linseed oil and the darkening began at 160° C. and the solution was almost black at 185° C. In another case cresol resin made with 300% of sulphur chloride was introduced when freshly made and while still in a slightly plastic state into linseed oil. The mixture blackened at about 100° C. and formed a gelatinous mass. In this case considerable hydrochloric acid was present and probably also some unchanged sulphur chloride which reacted on the linseed oil. In another case a sample of cresol made with 135% of sulphur chloride and which was free from acid was heated in linseed oil and the clear light reddish brown solution was gradually heated above 160° C. without perceptible darkening, at 180–185° C. the darkening began and at 190° C. the material was ruined for high grade varnish purposes. Thus in preparing the varnish vehicle it is important to not exceed the blackening point for making ordinary varnishes which as is well known have to be light in color, a pale varnish commanding the highest price. This regulation of temperature which involves conditions quite different from the heating of natural resins these oftentimes being melted and run or cracked at temperatures of 258° C. or thereabouts, forms a part of the present invention, at least in its preferred embodiment. In preparing a light colored solution of the resin in oil the resin may be heated in the oil to a temperature sufficient to dissolve the former but the temperature should not exceed the decomposition point of the resin. Normally the temperature should not rise above 200° C. and preferably not above 180° C. The heating as stated is best conducted in enamelled kettles or those made of aluminum.

As an example of the varnish made in accordance with the present invention and which involves the use of mixed solvents the following is given:

Metapara cresol was treated with 135% sulphur chloride with vigorous agitation, the hydrochloric acid fumes being withdrawn. The mass which was plastic from heating was blown with steam for a short time to deodorize, a temperature of 120° C. being employed. The resin was then baked in thin layers at 125° C. for 6½ hours. Equal weights of boiled linseed oil and this resin were heated together and thinned with 1¼ times the weight of turpentine. The melting was carried out at the lowest temperature possible and on addition of cold turpentine some of the resin precipitated as a yellow powder making the solution very turbid. This was cleared by the addition of amyl acetate to the amount of one-fourth the volume of turpentine used. When this varnish was poured out on glass in a fairly thick layer and allowed to dry it turns white or blushes in the thicker portions but the blush disappears on drying forming a clear transparent film.

In another case equal weights of raw linseed oil and cresol resin were heated to a temperature slightly under 200° C. the resin went into solution readily and formed a thick homogeneous product, to each volume of the latter two volumes of turpentine were added and also 5% of Japan drier. This varnish did not deposit any sediment on standing.

What I claim is:

1. A varnish basis comprising a solution in a drying oil of an oil-soluble phenolic sulphur resin.

2. A varnish basis comprising a solution in a drying oil of an oil-soluble cresol sulphur resin.

3. A varnish basis comprising a solution in a drying oil of an oil-soluble cresol sulphur resin, made with about 135% sulphur monochloride.

4. A varnish basis comprising a solution in a drying oil of a phenolic sulphur resin.

5. A coating composition or varnish comprising a solution of an oil-soluble phenolic sulphur resin, containing not less than 30% nor more than 70% of combined sulphur, dissolved in a drying oil and a thinning agent.

6. A coating composition or varnish comprising a solution of an oil-soluble cresol sulphur resin, containing not less than 30% of combined sulphur, dissolved in a drying oil and a thinning agent.

7. A coating composition or varnish comprising a solution of an oil-soluble phenolic sulphur resin dissolved in a drying oil and a thinning agent.

8. A coating composition or varnish comprising a solution of an oil-soluble cresol sulphur resin dissolved in drying oil and a thinning agent.

9. A coating composition comprising cresol sulphur resin containing not substantially less than 30% of combined sulphur, dissolved in a drying oil and incorporated with a thinner and drier.

10. A coating composition comprising a resin derived from cresol and 135% of sulphur chloride, such resin being dissolved in a drying oil and incorporated with a thinner and drier.

11. A coating composition comprising cresol sulphur resin dissolved in drying oil and incorporated with a thinner and drier.

12. A coating composition comprising cresol sulphur resin dissolved in slightly vulcanized drying oil and incorporated with a thinner and drier.

13. A coating composition comprising a sulphuric acid proof resin containing sulphur, dissolved in a drying oil and a thinning agent.

14. A coating composition comprising a drying oil, a pigment, a thinner and a phenolic sulphur resin.

15. A process of making an oil varnish basis which comprises heating a drying oil with an oil-soluble phenol sulphur resin whereby a solution of the resin in said oil is obtained such heating being to a temperature insufficient to greatly darken the resin, and thereafter diluting the composition with a thinning agent.

16. A process of making an oil varnish basis which comprises heating to not substantially over 200° C., a drying oil with an oil-soluble phenol sulphur resin whereby a solution of the resin in said oil is obtained and the oil is slightly vulcanized and thereafter diluting the composition with a thinning agent.

17. A process of making an oil varnish basis which comprises heating a drying oil with an oil-soluble cresol sulphur resin whereby a solution of the resin in said oil is obtained such heating being to a temperature insufficient to greatly darken the resin, and thereafter diluting the composition with a thinning agent.

18. A process of making an oil varnish basis which comprises heating to not substantially over 200° C., a drying oil with an oil-soluble phenolic sulphur resin whereby a solution of the resin in said oil is obtained such heating being to a temperature insufficient to greatly darken the resin, and thereafter diluting the composition with a thinning agent.

19. The process of making an oil varnish which comprises heating to not substantially over 200° C., a synthetic phenol sulphur resin in a drying oil at a temperature below the decomposition and blackening point of the phenol resin and thinning the composition by the addition of a thinning vehicle.

20. The process of making an oil varnish which comprises heating a synthetic cresol sulphur resin in a drying oil at a temperature sufficient to dissolve the resin but not in excess of 200° C., whereby a light-colored solution of the resin in the oil is obtained.

21. A coating composition containing an artificial sulfur resin adapted as a surface finish.

22. A coating composition containing an artificial sulfur resin and a drying oil.

23. A coating composition containing an artificial sulfur resin adapted as a surface finish, such composition being substantially free from free sulfur.

CARLETON ELLIS.